United States Patent
Medina et al.

(10) Patent No.: US 11,516,818 B1
(45) Date of Patent: Nov. 29, 2022

(54) SELECTING RADIO RESOURCE FOR DIRECT COMMUNICATION BETWEEN NTN TERMINALS

(71) Applicant: NOKIA TECHNOLOGIES OY, Espoo (FI)

(72) Inventors: Daniel Medina, Munich (DE); Jeroen Wigard, Klarup (DK); Sandra Hoppe, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/726,967

(22) Filed: Apr. 22, 2022

(30) Foreign Application Priority Data

Apr. 23, 2021 (FI) ...................................... 20215476

(51) Int. Cl.
*H04W 72/08* (2009.01)
*H04W 84/06* (2009.01)

(52) U.S. Cl.
CPC .......... *H04W 72/085* (2013.01); *H04W 84/06* (2013.01)

(58) Field of Classification Search
CPC ............... H04W 72/085; H04W 84/06; H04W 72/0406; H04W 72/1278; H04W 28/16; H04W 4/40
See application file for complete search history.

(56) References Cited

U.S. PATENT DOCUMENTS

| | | |
|---|---|---|
| 2018/0035435 A1 | 2/2018 | Gupta et al. |
| 2019/0098589 A1 | 3/2019 | Chae et al. |

(Continued)

FOREIGN PATENT DOCUMENTS

| | | |
|---|---|---|
| WO | 2020/231831 A1 | 11/2020 |
| WO | 2021/016638 A1 | 1/2021 |

(Continued)

OTHER PUBLICATIONS

Communication of Acceptance—section 29 a of Patents Decree dated Nov. 1, 2021 corresponding to Finnish Patent Application No. 20215476.
Finnish Search Reoprt dated Nov. 1, 2021 corresponding to Finnish Patent Application No. 20215476.
Qualcomm Inc., "Sidelink Resource Allocation Mechanism for NR V2X," 3GPP Draft; R1-1901307, 3GPP TSG RAN WG1 Ad-Hoc Meeting 1901, Taipei, Taiwan, Jan. 21-25, 2019, Jan. 21, 2019.
Extended European Search Report corresponding to EP Appln. No. 22164894.2, dated Sep. 15, 2022.

(Continued)

*Primary Examiner* — Shukri Taha
(74) *Attorney, Agent, or Firm* — Squire Patton Boggs (US) LLP

(57) ABSTRACT

An apparatus, method and computer program is described comprising: determining a set of candidate radio resources for transmitting data from a first communication node of a non-terrestrial network to a second communication node of the non-terrestrial network over a direct radio link; identifying one or more of the candidate radio resources as conflicting radio resources that conflict with at least one scheduled radio transmission in the non-terrestrial network based, at least in part, on a propagation delay associated with the at least one scheduled radio transmission and/or a propagation delay associated with the radio transmission by the first communication node; generating a subset of candidate radio resources by excluding the identified one or more conflicting radio resources from the set of candidate radio resources; and selecting a radio resource from the subset of candidate radio resources for transmitting the data over the direct radio link.

15 Claims, 13 Drawing Sheets

(56) References Cited

U.S. PATENT DOCUMENTS

2021/0051525 A1* 2/2021 Cao ..................... H04B 17/318
2021/0360605 A1* 11/2021 Hassan ............. H04W 72/1278

FOREIGN PATENT DOCUMENTS

WO 2021/030047 A1 2/2021
WO 2021/060936 A1 4/2021

OTHER PUBLICATIONS

Amitabha Ghosh et al., "5G Evolution: A View on 5G Cellular Technolgy Beyond 3GPP Release 15", IEEE Access, vol. 7, Sep. 16, 2019, XP011746509, pp. 127639-127651.

* cited by examiner

SELECTING RADIO RESOURCE FOR DIRECT COMMUNICATION BETWEEN NTN TERMINALS

FIELD

Example embodiments relate to an apparatus, method and computer program for scheduling of radio resources, for example scheduling of sidelink radio resources for communications between first and second non-terrestrial network (NTN) terminals such as aircraft, vessels, or other forms of NTN user equipment (UE).

BACKGROUND

The Fifth Generation (5G) New Radio (NR) air interface may be enhanced to support Non-Terrestrial Networks (NTNs) with an aim of providing global connectivity through space borne and airborne communications platforms, such as by using satellites and high altitude platform stations (HAPS). There remains a need for further developments in this field.

SUMMARY

In a first aspect, this specification describes an apparatus comprising means for performing: determining a set of candidate radio resources for transmitting data from a first communication node of a non-terrestrial network to a second communication node of the non-terrestrial network over a direct radio link; identifying one or more of the candidate radio resources as conflicting radio resources that conflict with at least one scheduled radio transmission (which may, for example, be a sidelink, uplink or downlink transmission) in the non-terrestrial network based, at least in part, on a propagation delay associated with the at least one scheduled radio transmission and/or a propagation delay associated with the radio transmission by the first communication node; generating a subset of candidate radio resources by excluding the identified one or more conflicting radio resources from the set of candidate radio resources; and selecting a radio resource from the subset of candidate radio resources for transmitting the data over the direct radio link. The apparatus may be a Physical Sidelink Shared Channel (PSSCH) scheduler, which might, for example, be provided at a base station on a satellite or on the ground. The first and second communication nodes may be non-terrestrial network terminals (UEs). They may be located on (or form part of) an aircraft, vessel, high altitude platform or the like.

The direct radio link may be a sidelink, such as a New Radio (NR) sidelink.

In some example embodiments, the means for performing identifying the one or more conflicting radio resources further comprises means for performing: determining an estimated reception time interval at the first communication node for receiving a scheduled radio transmission by a third communication node of the non-terrestrial network using a transmission time interval for the scheduled radio transmission and a propagation delay (e.g., an estimated propagation delay) between the third and first communication nodes; and identifying one or more candidate radio resources overlapping in time with the estimated reception time interval at the first communication node. In this way, half-duplex conflicts may be avoided.

In some example embodiments, the means for performing identifying the one or more conflicting radio resources further comprises means for performing: determining estimated reception time intervals at the second communication node for at least some of the set of candidate radio resources based on respective transmission time intervals of said candidate radio resources and the propagation delay between the first and second communication nodes; and identifying one or more candidate radio resources having estimated reception time intervals at the second communication node which overlap in time with a scheduled radio transmission by the second communication node. In this way, further half-duplex conflicts may be avoided.

Some example embodiments further comprise means for performing: determining one or more first time intervals during which a maximum number of simultaneous transmit links (e.g., sidelinks) is scheduled to be operated by the first communication node and wherein the means for performing identifying the one or more conflicting radio resources is configured to identify one or more candidate radio resources overlapping in time with any of said first time intervals.

Some example embodiments further comprise means for performing: determining one or more second time intervals during which a maximum number of simultaneous receive links (e.g., sidelinks) is scheduled to be operated by the second communication node and wherein the means for performing identifying the one or more conflicting radio resources is configured to determine estimated reception time intervals at the second communication node using respective transmission time intervals associated with the candidate radio resources and the propagation delay between the first and second communication nodes, and to identify one or more candidate radio resources having respective reception time intervals which overlap in time with any of said second time intervals.

Some example embodiments further comprise means for performing: determining, for some or all of the candidate radio resources, a first set of interfering links having potential to cause interference at the second communication node; and determining a first predicted SINR for communication over the direct radio link based, at least in part, on a difference between a first propagation delay between the first and second communication nodes and a second propagation delay between a transmitting node of at least one interfering link of the first set of interfering links and the second communication node. The first predicted SINR may be determined based on a direction-dependent antenna gain of one or more of: the first communication node, the second communication node, the transmitting node of the at least one interfering link. The means for performing selecting the radio resource from the subset of candidate radio resources for transmitting the data over the direct radio link may be configured to select the candidate radio resource that maximises the first predicted SINR.

Some example embodiments further comprise means for performing: determining, for some or all of the candidate radio resources, a second set of interfered links having potential to experience interference due to radio transmissions from the first communication node to the second communication node; and determining a second predicted SINR for communication over at least one interfered link of the second set of interfered links based, at least in part, on a difference between a third propagation delay between the first communication node and a receiving node of the at least one interfered link and a fourth propagation delay between transmitting and receiving nodes of the at least one interfered link. The second predicted SINR may be determined based on a direction-dependent antenna gain of the transmitting and/or receiving nodes of the at least one interfered link, and/or the first communication node. The means for performing selecting the radio resource from the subset of candidate radio resources for transmitting the data over the direct radio link may be configured to select the candidate radio resource that maximises a lowest second predicted SINR among a plurality of interfered links of the second set of interfered links.

In some example embodiments, the means for selecting the radio resource from the subset of candidate radio resources for transmitting the data over the direct radio link may be configured to select the candidate radio resource that maximises the minimum among the first predicted SINR and the lowest second predicted SINR.

The said means may comprise: at least one processor; and at least one memory including computer program code, the at least one memory and computer program code configured to, with the at least one processor, cause the performance of the apparatus.

In a second aspect, this specification describes a method comprising: determining a set of candidate radio resources for transmitting data from a first communication node of a non-terrestrial network to a second communication node of the non-terrestrial network over a direct radio link (such as a sidelink); identifying one or more of the candidate radio resources as conflicting radio resources that conflict with at least one scheduled radio transmission in the non-terrestrial network based, at least in part, on a propagation delay associated with the at least one scheduled radio transmission and/or a propagation delay associated with the radio transmission by the first communication node; generating a subset of candidate radio resources by excluding the identified one or more conflicting radio resources from the set of candidate radio resources; and selecting a radio resource from the subset of candidate radio resources for transmitting the data over the direct radio link. The method may be implemented by a Physical Sidelink Shared Channel (PSSCH) scheduler. The first and second communication nodes may be non-terrestrial network terminals (UEs), such as radio modules mounted on aircraft, vessels, etc.

Identifying the one or more conflicting radio resources may further comprise: determining an estimated reception time interval at the first communication node for receiving a scheduled radio transmission by a third communication node of the non-terrestrial network using a transmission time interval for the scheduled radio transmission and a propagation delay (e.g., an estimated propagation delay) between the third and first communication nodes; and identifying one or more candidate radio resources overlapping in time with the estimated reception time interval at the first communication node. In this way, half-duplex conflicts may be avoided.

Identifying the one or more conflicting radio resources may further comprise: determining estimated reception time intervals at the second communication node for at least some of the set of candidate radio resources based on respective transmission time intervals of said candidate radio resources and the propagation delay between the first and second communication nodes; and identifying one or more candidate radio resources having estimated reception time intervals at the second communication node which overlap in time with a scheduled radio transmission by the second communication node. In this way, further half-duplex conflicts may be avoided.

The method may further comprise: determining one or more first time intervals during which a maximum number of simultaneous transmit links (e.g., sidelinks) is scheduled to be operated by the first communication node and wherein the means for performing identifying the one or more conflicting radio resources is configured to identify one or more candidate radio resources overlapping in time with any of said first time intervals.

The method may further comprise: determining one or more second time intervals during which a maximum number of simultaneous receive links (e.g., sidelinks) is scheduled to be operated by the second communication node and wherein identifying the one or more conflicting radio resources may be configured to determine estimated reception time intervals at the second communication node using respective transmission time intervals associated with the candidate radio resources and the propagation delay between the first and second communication nodes, and to identify one or more candidate radio resources having respective reception time intervals which overlap in time with any of said second time intervals.

The method may further comprise: determining, for some or all of the candidate radio resources, a first set of interfering links having potential to cause interference at the second communication node; and determining a first predicted SINR for communication over the direct radio link based, at least in part, on a difference between a first propagation delay between the first and second communication nodes and a second propagation delay between a transmitting node of at least one interfering link of the first set of interfering links and the second communication node. The first predicted SINR may be determined based on a direction-dependent antenna gain of one or more of: the first communication node, the second communication node, the transmitting node of the at least one interfering link. The radio resource may be selected to maximise the first predicted SINR.

The method may further comprise: determining, for some or all of the candidate radio resources, a second set of interfered links having potential to experience interference due to radio transmissions from the first communication node to the second communication node; and determining a second predicted SINR for communication over at least one interfered link of the second set of interfered links based, at least in part, on a difference between a third propagation delay between the first communication node and a receiving node of the at least one interfered link and a fourth propagation delay between transmitting and receiving nodes of the at least one interfered link. The second predicted SINR may be determined based on a direction-dependent antenna gain of the transmitting and/or receiving nodes of the at least one interfered link, and/or the first communication node. The radio resource may be selected from the subset of candidate radio resources for transmitting the data over the direct radio link to maximise a lowest second predicted SINR among a plurality of interfered links of the second set of interfered links.

The method may further comprise: selecting the radio resource from the subset of candidate radio resources for transmitting the data over the direct radio link to maximise the minimum among the first predicted SINR and the lowest second predicted SINR.

In a third aspect, this specification describes computer-readable instructions which, when executed by a computing apparatus, cause the computing apparatus to perform (at least) any method as described with reference to the second aspect.

In a fourth aspect, this specification describes a computer-readable medium (such as a non-transitory computer-readable medium) comprising program instructions stored thereon for performing (at least) any method as described with reference to the second aspect.

In a fifth aspect, this specification describes an apparatus comprising: at least one processor; and at least one memory including computer program code which, when executed by the at least one processor, causes the apparatus to perform (at least) any method as described with reference to the second aspect.

In a sixth aspect, this specification describes a computer program comprising instructions for causing an apparatus to perform at least the following: determining a set of candidate radio resources for transmitting data from a first communication node of a non-terrestrial network to a second communication node of the non-terrestrial network over a direct radio link; identifying one or more of the candidate radio resources as conflicting radio resources that conflict with at least one scheduled radio transmission in the non-terrestrial network based, at least in part, on a propagation delay associated with the at least one scheduled radio transmission and/or a propagation delay associated with the radio transmission by the first communication node; generating a subset of candidate radio resources by excluding the identified one or more conflicting radio resources from the set of candidate radio resources; and selecting a radio resource from the subset of candidate radio resources for transmitting the data over the direct radio link.

In a seventh aspect, this specification describes: a PSSCH scheduler (or some other means) for determining a set of candidate radio resources for transmitting data from a first communication node (e.g., an NTN terminal) of a non-terrestrial network to a second communication node (e.g., an NTN terminal) of the non-terrestrial network over a direct radio link; a conflict detecting module of the PSSCH scheduler (or some other means) for identifying one or more of the candidate radio resources as conflicting radio resources that conflict with at least one scheduled radio transmission (which may, for example, be a sidelink, uplink or downlink transmission) in the non-terrestrial network based, at least in part, on a propagation delay associated with the at least one scheduled radio transmission and/or a propagation delay associated with the radio transmission by the first communication node; a control module of the PSSCH scheduler (or some other means) for generating a subset of candidate radio resources by excluding the identified one or more conflicting radio resources from the set of candidate radio resources; and a selection module of the PSSCH scheduler (or some other means) for selecting a radio resource from the subset of candidate radio resources for transmitting the data over the direct radio link.

BRIEF DESCRIPTION OF DRAWINGS

Example embodiments will now be described by way of non-limiting example, with reference to the accompanying drawings, in which.

DETAILED DESCRIPTION

Figure 1:
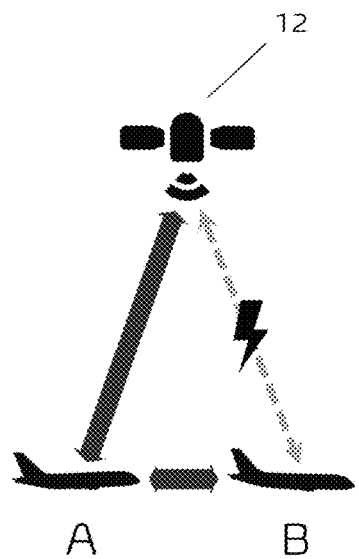
FIGS. 1 to 4 are block diagrams of systems in accordance with example embodiments.

The scope of protection sought for various embodiments of the invention is set out by the independent claims. The embodiments and features, if any, described in the specification that do not fall under the scope of the independent claims are to be interpreted as examples useful for understanding various embodiments of the invention.

In the description and drawings, like reference numerals refer to like elements throughout.

Example embodiments relate to an apparatus, method and computer program for scheduling of radio resources, for example scheduling of sidelink radio resources for communications between first and second non-terrestrial network (NTN) terminals such as aircraft, vessels, or other forms of NTN user equipment (UE).

NTNs may enable global connectivity through space borne and airborne communications platforms, such as by using satellites and high altitude platform stations (HAPS). The standardization in 3GPP Rel-16 of NR sidelink for direct communications between UEs may provide a way of improving performance in NTNs in terms of allowing direct communication via sidelink between NTN UEs, such as between aircraft, vessels, etc. For example, with reference to FIGS. 1 to 3, some scenarios will now be explained which may be useful for understanding of example embodiments.

FIG. 1 is a block diagram of a system, indicated generally by the reference numeral 10, in accordance with an example embodiment. The system 10 comprises a first aircraft A, a second aircraft B and a satellite 12. Communications from a user device at either aircraft may be routed via the satellite 12, which may act as a base station.

In the system 10, in the case of a satellite link failure or degradation of satellite link quality between the satellite and the second aircraft B, a quality of service may be maintained at a user device associated with the aircraft B by re-routing of data from the satellite 12 to the UE via an intermediate and neighbouring user device associated with the first aircraft A.

Figure 2:
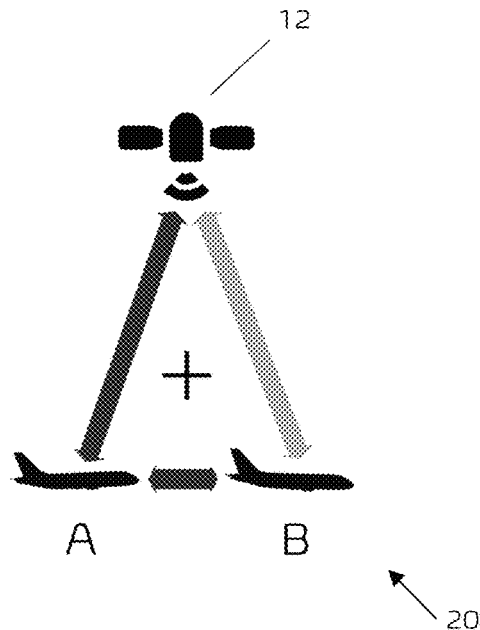

FIG. 2 is a block diagram of a system, indicated generally by the reference numeral 20, in accordance with an example embodiment. The system 20 comprises the first aircraft A, the second aircraft B and the satellite 12 of the system 10 described above.

In the system 20, in the case of a high peak in instantaneous traffic demand on-board the second aircraft B, which cannot be fulfilled by the maximum capacity of a respective satellite link, additional data streams may be aggregated via one or more neighbouring UEs, e.g., a UE associated with the first aircraft A, to increase peak throughput.

Figure 3:
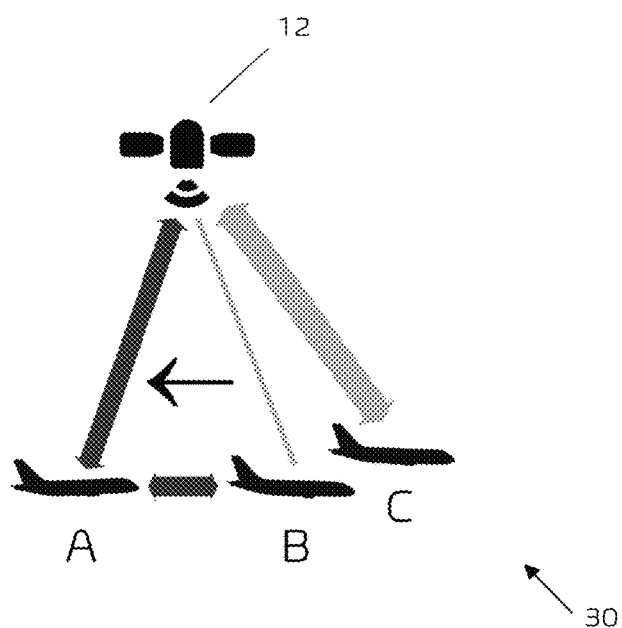

FIG. 3 is a block diagram of a system, indicated generally by the reference numeral 30, in accordance with an example embodiment. The system 30 comprises the first aircraft A, the second aircraft B and the satellite 12 of the systems 10 and 20 described above and further comprises a third aircraft C.

In the system 30, the second aircraft B is associated with an overloaded satellite beam, e.g., because user devices of the third aircraft C are taking almost all of the beam's capacity. The second aircraft B may still be able to meet its traffic demand by re-routing some or all of the traffic via the first aircraft A which may be served by an underutilized satellite beam.

Thus, by allowing direct radio communication between NTN terminals (UEs) (e.g., aircraft, vessels, etc.), NTN performance may be improved by enhancing reliability, increasing throughput and/or load balancing.

Figure 4:
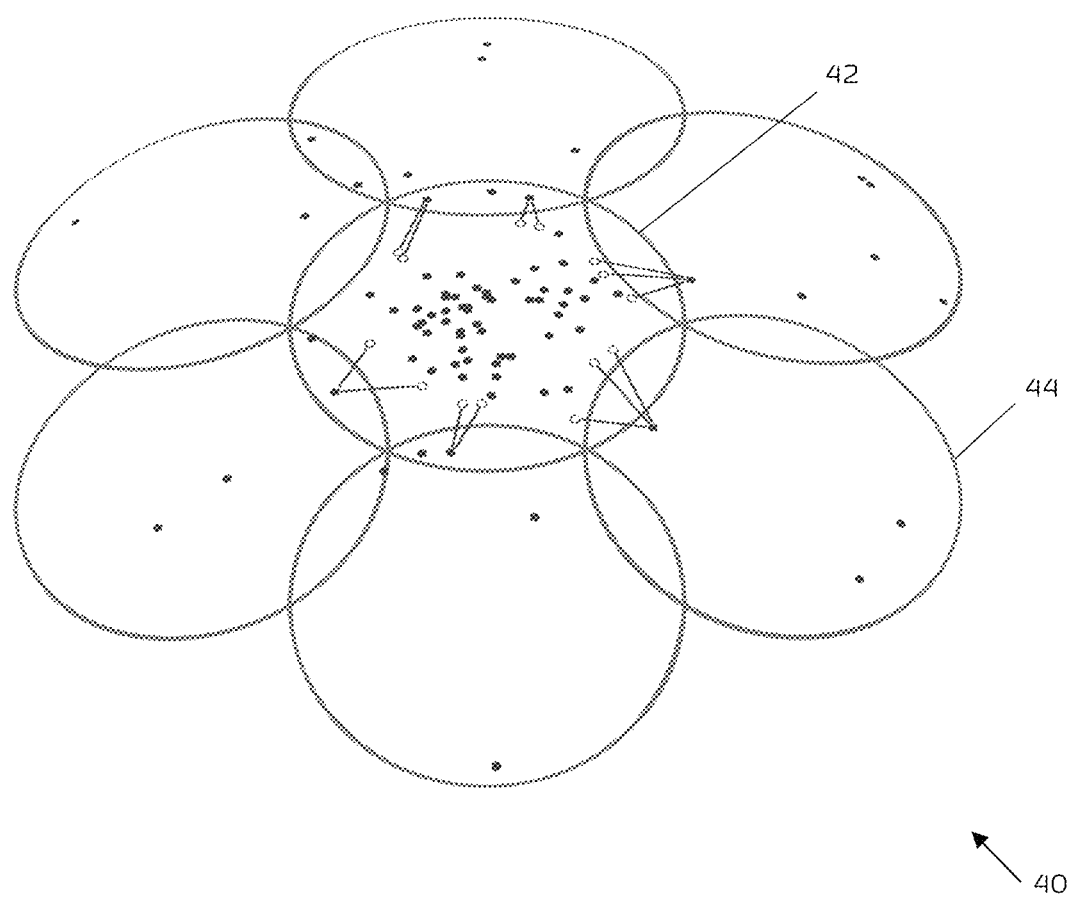

FIG. 4 is a block diagram of a system, indicated generally by the reference numeral 40, in accordance with an example embodiment. The system 40 comprises a plurality of user devices located within different zones (e.g., satellite spot-beams). As shown in FIG. 4, a central zone 42 of the plurality includes a large number of devices, and may become overloaded. For example, the system 40 may show the locations of aircraft in a stacking formation above a busy airport, with most of the aircraft being within the central zone 42.

The system 40 illustrates how sidelinks may be used to offload a congested spotbeam by rerouting traffic from UEs within the central zone 42 to UEs served by neighbouring, underutilized spotbeams, thus improving the NTN system performance. For example, three devices within the central zone 42 are each shown using sidelinks to communicate via a node within a second zone 44 of the plurality of zones.

The distance between UEs in an NTN scenario (such as in the systems 10, 20, 30 and 40) may be large compared to, for example, vehicle-to-everything (V2X) scenarios where the distance is typically, at most, hundreds of metres. For example, the distance between UEs of different aircraft may be in the order of tens or hundreds of kilometres. Sidelinks may be established between such UEs using specific antennas with higher transmit powers, but such distances may lead to propagation delays in the order of one millisecond. Considering that NR sidelink transmissions may occur in the so-called Physical Sidelink Shared Channel (PSSCH) using slots of duration between 125 μs and 1 ms, sidelink propagation delays in the order of one millisecond may correspond to several slot durations.

One possible way of addressing the issue of propagation delays is to use so-called "slot aggregation", whereby a user effectively spreads its transmission over multiple consecutive slots (e.g., through blind repetitions). Slot aggregation increases radio access latency, as each user occupies the channel for an extended period of time. Moreover, long guard intervals (GI) (in the order of 1 ms) may be necessary in order to deal with the long sidelink propagation delays, resulting in a loss of spectral efficiency. For large subcarrier spacing (SCS) (e.g., in mmWave spectrum) it may be necessary to aggregate many slots in order to minimize the fraction of time allocated to GIs. For example, assuming a 1 ms GI after a 4 ms aggregated transmission time (leading to 20% spectral efficiency loss), for a SCS of 120 kHz (i.e., each slot has a duration of 125 μs) it would be necessary to aggregate 32 slots.

As discussed in detail below, instead of using solutions such as slot aggregation, example embodiments described herein consider propagation delays and use this knowledge to identify and avoid scheduling conflicts for use in scheduling radio resources. Such scheduling of radio resources may be performed by a scheduler (e.g., a PSSCH scheduler), which may be provided at a gNB. The gNB may be under the control of a satellite operator.

Figure 5:
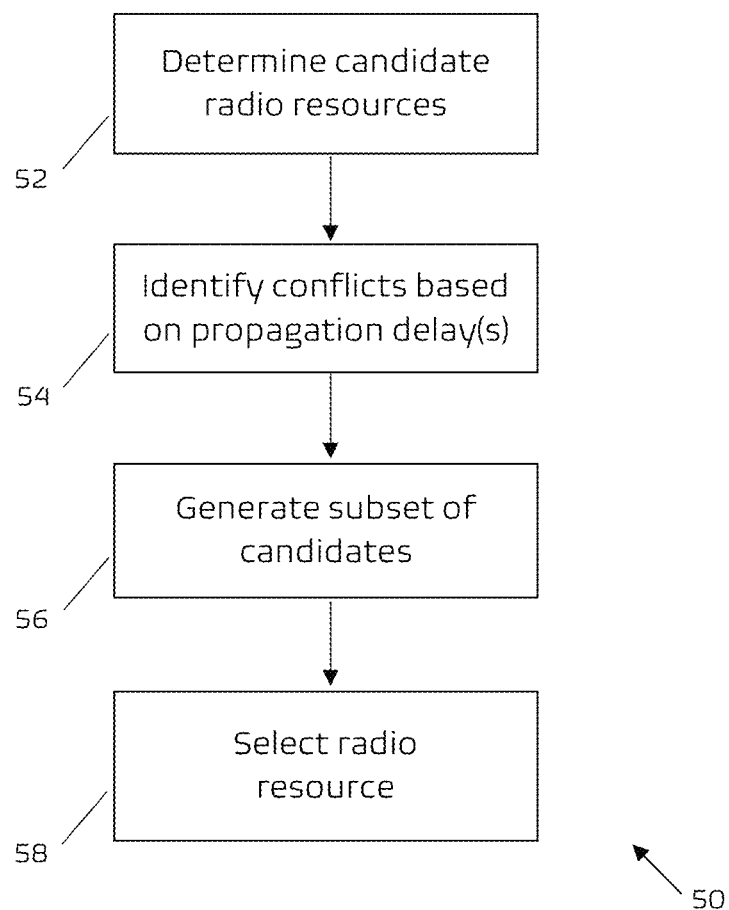
FIG. 5 is a flow chart showing an algorithm in accordance with an example embodiment.

FIG. 5 is a flow chart showing an algorithm, indicated generally by the reference numeral 50, in accordance with an example embodiment. The algorithm 50 may, for example, be implemented by a Physical Sidelink Shared Channel (PSSCH) scheduler.

The algorithm 50 starts at operation 52, where a set of candidate radio resources for transmitting data from a first communication node of a non-terrestrial network (NTN) to a second communication node of the non-terrestrial network over a direct radio link (e.g., a NR sidelink) is determined. The first and second communication nodes may be NTN terminals (UEs). These terminals may be located at (or form part of) an aircraft, a ship, a high altitude platform or the like. For example, the operation 52 may determine a set of candidate radio resources for transmitting data between UEs on the first and second aircraft A and B described above.

A candidate radio resource may be defined by a time-domain resource (e.g., one or more slots) and/or a frequency-domain resource (e.g., one or more subchannels). The gNB may determine a resource size (e.g., length of contiguous subchannels) in the frequency domain (e.g., on the basis of a received buffer status report). For example, a high buffer level may lead the gNB to consider a large resource, whereas a low buffer level may lead the gNB to consider a small resource.

Figure 6:
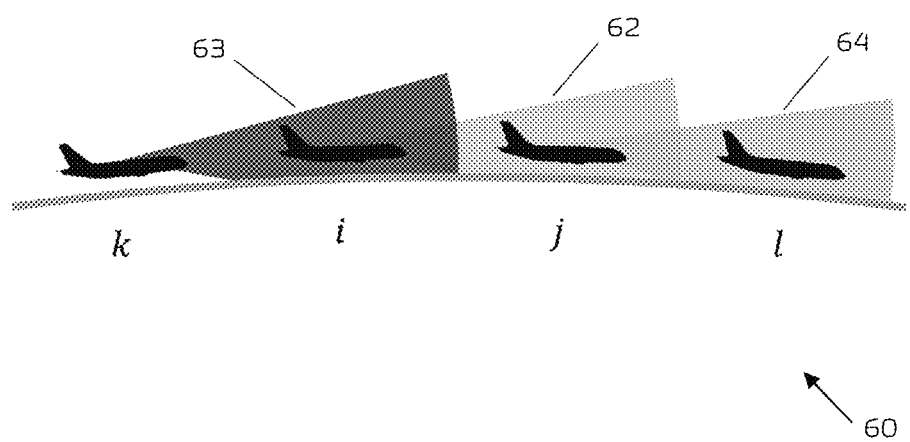
FIG. 6 is a block diagram of a system in accordance with an example embodiment.

FIG. 6 is a block diagram of a system, indicated generally by the reference numeral 60, in accordance with an example embodiment. The system 60 includes schematic indications of a first communication link (i,j) 62 for transmissions from a first device i to a second device j, a second communication link (k,i) 63 for transmissions from a third device k to the first device i and a third communication link (j,l) 64 for transmissions from the second device j to a fourth device l. Other transmissions are also possible (e.g., transmissions in the opposite directions to the transmissions discussed above). The devices shown in the system 60 are aircraft, but the principles described herein apply to other example embodiments.

Upon receiving from a source UE (such as the first device i) a scheduling request (SR) or buffer status report (BSR) related to a sidelink logical channel between the source UE and a destination UE (such as the second device j), the relevant gNB first determines a candidate resource set for transmission of PSSCH (see the operation 52 of the algorithm 50). Such a set may be constrained by a configured sidelink resource pool for the source UE, i.e., only radio resources within the configured sidelink resource pool may be considered as potential candidates. The candidate resource set may also be constrained by a time interval (i.e., a resource selection window) imposed by the requirement to fulfill a predefined packet delay budget, i.e., only radio resources within the time interval may be considered as potential candidates. The candidate resource set may also be constrained by a determined resource size.

At operation 54 of the algorithm 50, conflicts are identified (for example by a conflict detecting module of a PSSCH scheduler). For example, one or more of the candidate radio resources for transmission from the first device i to the second device j (as generated in the operation 52) that conflict with at least one scheduled radio transmission in the non-terrestrial network may be determined based, at least in part, on a propagation delay associated with the at least one scheduled radio transmission and/or a propagation delay associated with the radio transmission by the first device i. The conflicts may be determined based on the observation that a device cannot simultaneously transmit and receive PSSCH on the same carrier (due to self-interference), which may be referred to as a half-duplex (HD) conflict.

At operation 56, a subset of candidate radio resources is generated (for example by a control module of a PSSCH scheduler). by excluding the one or more conflicting radio resources identified in the operation 54 from the set of candidate radio resources determined in the operation 52.

Finally, a radio resource is selected in operation 58 from the subset of candidate radio resources for transmitting the data (e.g., over the direct radio link (i,j)). The operation 58 may be implemented by a selection module of a PSSCH scheduler.

As discussed in detail below, the operation 58 may select a radio resource from the subset of candidate radio resources (e.g., those that have not been excluded due to a source UE (such as the first device i) or destination UE (such as the second device j) being unavailable). In particular, the relevant PSSCH scheduler may select a radio resource (t*,f*) for transmission of PSSCH on link (i,j) based on an expected (i.e., predicted, rather than measured) signal-to-interference-plus-noise ratio (SINR).

Figure 7:
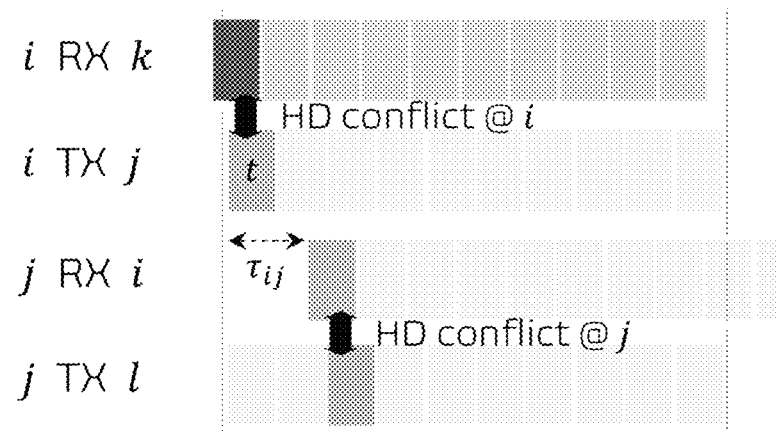
FIG. 7 is a timing diagram in accordance with an example embodiment.

FIG. 7 is a timing diagram, indicated generally by the reference numeral 70, in accordance with an example embodiment.

The timing diagram 70 shows the relative timing of:
Signals received at the first device i from the third device k (over the second communication link 63);
Signals transmitted by the first device i to the second device j (over the first communication link 62);
Signals received at the second device j from the first device i (over the first communication link 62); and
Signals transmitted by the second device j to the fourth device l (over the third communication link 64).

As shown in the timing diagram 70, a half-duplex conflict occurs at the first device i if that device tries to transmit at the same time as receiving the signals transmitted by the third device k. Similarly, a half-duplex conflict occurs at the second device j if that device tries to transmit at the same time as receiving the signals transmitted by the first device i. The sidelink (SL) propagation delay for a link (i,j) (hereafter denoted by $\tau_{ij}$) impacts which transmission slot at the source UE (i) interferes with which slot(s) at the destination UE (j). Assuming that a UE is not capable of transmitting and receiving PSSCH simultaneously on a carrier, the SL propagation delay needs to be taken into account by the PSSCH scheduler when allocating radio resources in order to avoid half-duplex (HD) conflicts.

More specifically, as shown in the timing diagram 70, a slot (t) during which the source UE (i) is expected to receive PSSCH from another UE (k) may be excluded from the candidate resource set, as scheduling link (i,j) in that slot would lead to self-interference at the source UE (i) and prevent successful decoding of the received PSSCH. For example, if a link (k,i) has been scheduled in a slot t' and the corresponding reception time interval (t'+$\tau_{ki}$) overlaps with slot t, then the source UE (i) is expected to receive PSSCH during slot t. As a result, the source UE (i) may not be scheduled for transmission to the destination UE (j) in slot t. The PSSCH scheduler takes into account the respective SL propagation delay ($\tau_{ki}$) when determining whether a HD conflict exists at the source UE.

Similarly, a slot (t) for which the destination UE's (j) reception time interval (t+$\tau_{ij}$) overlaps with a scheduled PSSCH transmission by the destination UE (j) to another UE (l) may be excluded from the candidate resource set, as scheduling link (i,j) in that slot would lead to self-interference at the destination UE (j). For example, if a link (j,l) has been scheduled in a slot t' overlapping with the reception time interval (t+$\tau_{ij}$) of link (i,j), then the destination UE (j) is expected to transmit during the time in which it would be receiving from the source UE (i). As a result, the source UE (i) may not be scheduled for transmission to the destination UE (j) in slot t. The PSSCH scheduler takes into account the respective SL propagation delay ($\tau_{ij}$) when determining whether a HD conflict exists at the destination UE.

The SL propagation delay ($\tau_{ij}$) may be determined by the gNB on the basis of a location (e.g., geographic coordinates) of the UEs. More specifically, the gNB may determine a distance $r_{ij}$ between a pair of UEs (i,j) based on their respective locations, and subsequently determine the SL propagation delay ($\tau_{ij}$) by dividing such distance ($r_{ij}$) by the speed of light (c), i.e., $\tau_{ij}=r_{ij}/c$.

The gNB may also configure a UE to report a SL propagation delay (e.g., in case UE location information is not available or is incomplete). Such a measurement report may be conveyed by the UE using an RRC message or a MAC Control Element (CE) in the uplink. Specific SL propagation delay values may be reported to the gNB by using an index into a predefined table of possible values.

Figure 8:
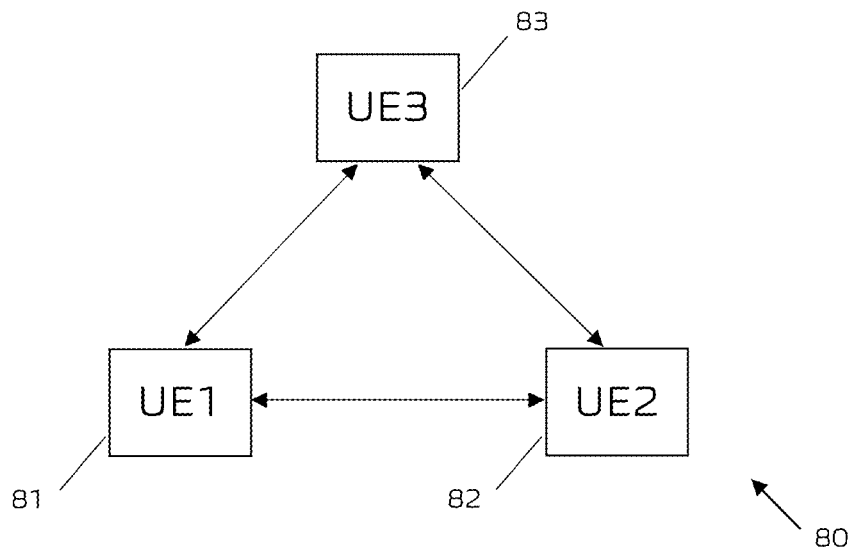
FIG. 8 is a block diagram of a system in accordance with an example embodiment.

FIG. 8 is a block diagram of a system, indicated generally by the reference numeral 80, in accordance with an example embodiment. The system 80 comprises a first user device (UE1) 81, a second user device (UE2) 82 and a third user device (UE3) 83. Each user device may be able to communicate with one or both of the other user devices, for example using NR sidelinks, as discussed above.

In order to schedule a transmission from the first user device 81 to the second user device 82, a PSSCH scheduler may determine when the first user device 81 is scheduled to transmit data or receive data to/from any other device. Similarly, for all candidate transmission times, the PSSCH scheduler may determine whether the second user device 82 is scheduled to transmit data or receive data to/from any other device at the time at which the candidate transmission from the first user device would arrive at the second user device. Thus, knowledge of the relevant propagation delays is needed.

Figure 9:
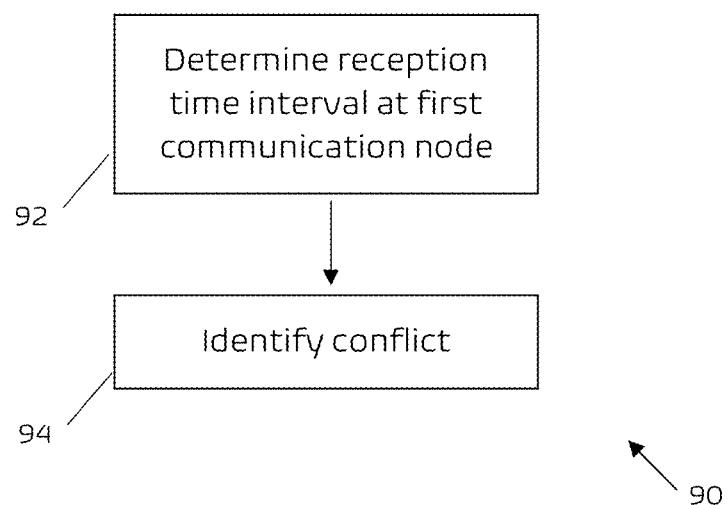
FIGS. 9 to 11 are flow charts showing algorithms in accordance with example embodiments.

FIG. 9 is a flow chart showing an algorithm, indicated generally by the reference numeral 90, in accordance with an example embodiment. The algorithm 90 may be implemented using the system 8o or some similar system.

The algorithm 90 starts at operation 92, where an estimated reception time interval at a first communication node (such as the first user device 81) is determined for a scheduled radio transmission by a third communication node (such as the third user device 83) of a non-terrestrial network. This determined reception time interval is based on a transmission time interval for the scheduled radio transmission and a propagation delay (e.g., an estimated propagation delay) between the third and first communication nodes.

At operation 94, one or more candidate radio resources overlapping in time with the reception time interval determined in the operation 92 are identified. Those candidate radio resources are identified as conflicting with the scheduled radio transmission of the third communication node and thereby provide an example implementation of the operation 54 of the algorithm 50.

Figure 10:
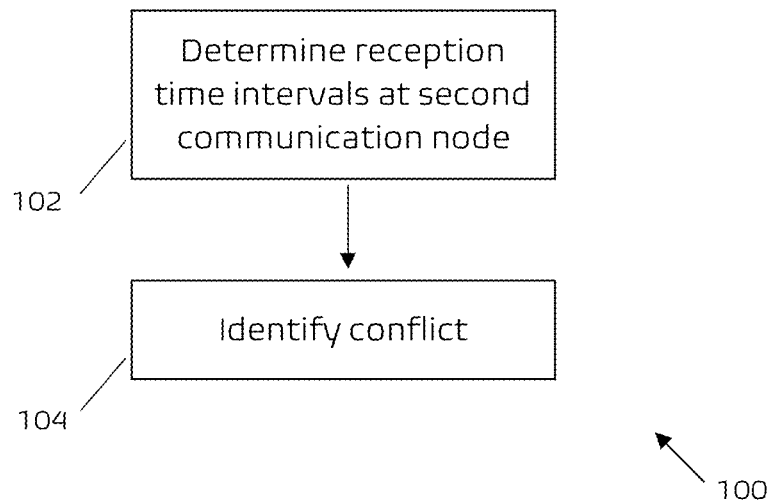

FIG. 10 is a flow chart showing an algorithm, indicated generally by the reference numeral 100, in accordance with an example embodiment. The algorithm 100 may be implemented using the system 80 or some similar system.

The algorithm 100 starts at operation 102, where estimated reception time intervals at a second communication node (such as the second user device 82) are determined for at least some of the set of candidate radio resources (that may be transmitted by the first user device 81) based on respective transmission time intervals of said candidate radio resources and the propagation delay (e.g., an estimated propagation delay) between the first communication node (e.g., first used device 81) and the second communication node (e.g., the second user device 82).

At operation 104, one or more candidate radio resources having estimated reception time intervals at the second communication node which overlap in time with a scheduled radio transmission by the second communication node are identified. Those candidate radio resources are identified as conflicting with the scheduled radio transmission of the second communication node and thereby provide an example implementation of the operation 54 of the algorithm 50.

Of course, an example implementation of the operation 54 of the algorithm 50 may use both the algorithm 80 and the algorithm 90 described above. In this way, half-duplex conflicts can be identified (and prevented) based on knowledge of the appropriate propagation delays.

In addition to, or instead of, identifying half-duplex conflicts, other forms of conflict may be identified in example implementations of the operation 54, as discussed further below.

In the generation of a subset of candidate radio resources (e.g., in the operation 56 described above), a slot may be excluded from the candidate resource set based on a UE capability in terms of a maximum number of simultaneously active SL transmit or receive beams. For example, if the source UE (i) can form at most two SL transmit beams at a time, and two outgoing links $(i,k_1)$ and $(i,k_2)$ have already been scheduled in a slot t, then it may not be possible to schedule a third link (i,j) in the same slot t. Similarly, if the destination UE (j) can form at most two SL receive beams at a time, and two incoming links $(l_1,j)$ and $(l_2,j)$ have already been scheduled such that the destination UE (j) is expected to receive simultaneously on both links during time interval $(t+\tau_{ij})$, then it may not be possible to schedule a third link (i,j) in slot t. In this case, the PSSCH scheduler takes into account the respective SL propagation delays when determining the number of SL receive beams expected to be simultaneously active in a reception time interval.

The gNB may configure a UE to report a UE capability in terms of a maximum number of simultaneously active transmit or receive SL beams, in order to assist the PSSCH scheduler in determining the UE's transmit (or receive) availability in a specific slot. Such a report may be conveyed by the UE using an RRC message or a MAC Control Element (CE) in the uplink.

Figure 11:
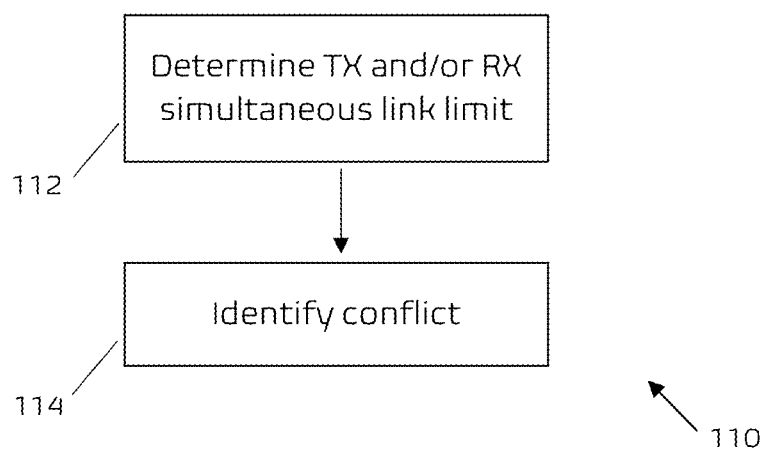

FIG. 11 is a flow chart showing an algorithm, indicated generally by the reference numeral 110, in accordance with an example embodiment.

The algorithm 110 starts at operation 112, where one or more first time intervals during which a maximum number of simultaneous transmit links (e.g., sidelinks) is scheduled to be operated by the first communication node is/are identified and/or one or more second time intervals during which a maximum number of simultaneous receive links is scheduled to be operated by the second communication node is/are identified.

At operation 114, one or more candidate radio resources overlapping in time with any of said first time intervals and/or having respective reception time intervals at the second communication node which overlap in time with any of said second time intervals is identified as a conflicting radio resource.

Thus, the algorithm 110 is an example implementation of the operation 54 of the algorithm 50.

As discussed above, conflicts can arise in the scheduling of multiple Physical Sidelink Shared Channel (PSSCH) transmissions. A related issue can arise when scheduling Physical Sidelink Shared Channel (PSSCH) transmissions and Physical Uplink Shared Channel (PUSCH) transmissions.

Figure 12:
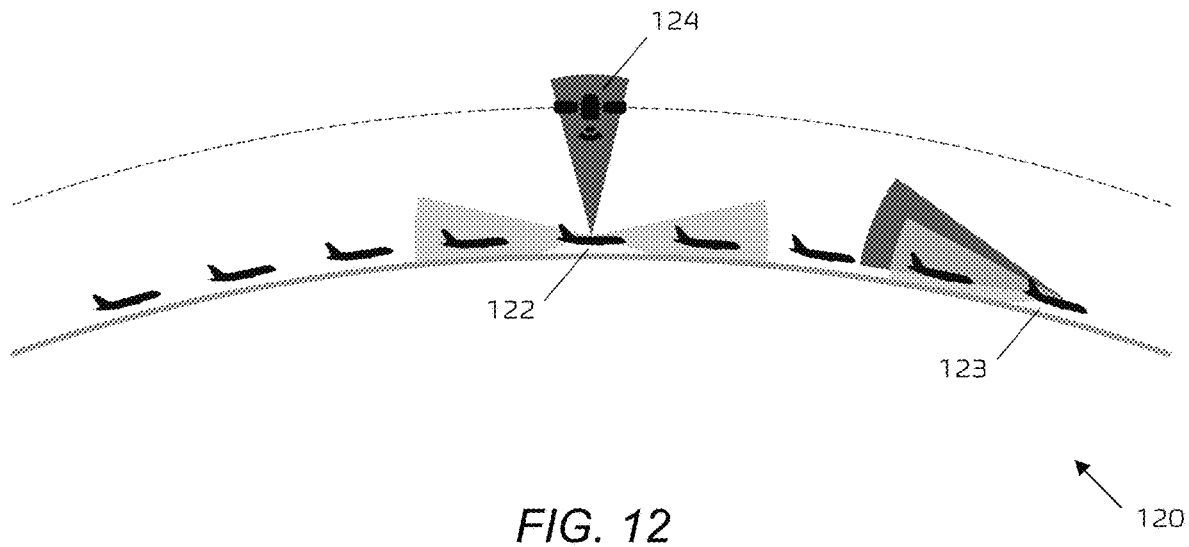
FIGS. 12 and 13 are block diagrams of systems in accordance with example embodiments.

FIG. 12 is a block diagram of a system, indicated generally by the reference numeral 120, in accordance with an example embodiment. The system 120 comprises a plurality of aircraft (including first aircraft 122 and second aircraft 123) and a satellite 124. As shown in the system 120, the first aircraft 122 is able to communicate with each of its neighbours using a sidelink (SL) and is also able to communicate with the satellite 124 using an NTN antenna. The NTN antenna of the first aircraft 122 is mounted on top of an aircraft's fuselage for transmission of PUSCH signals to the satellite 124, which signals are likely to be highly directional (to increase SNR). Similarly, the sidelink communications with the neighbouring aircraft are likely to be directional at least in elevation (i.e., almost no energy radiated to space).

As shown in the system 120, sidelink (PSSCH) transmissions from the second aircraft 123 may conflict with uplink (PUSCH) transmissions from the second aircraft 123 (e.g., due to overlapping transmit beams). Thus, in some circumstances, PSSCH and PUSCH may need to be scheduled in orthogonal radio resources. Accordingly, the PSSCH scheduler described herein makes use of a UE's three-dimensional (3D) SL beam radiation pattern (azimuth and elevation) in order to determine the PSSCH interference potential among UEs as well as the PSSCH/PUSCH interference potential. A further motivation for using 3D radiation patterns is that different UEs (aircraft, vessels, etc.) may be located at different altitudes.

As discussed above, from the subset of candidate slots generated in the operation 56 of the algorithm 50 (i.e., those that have not been excluded due to the source UE (i) or destination UE (j) being unavailable, based on a half-duplex constraint and/or the constraint on a maximum number of simultaneous beams), a PSSCH scheduler selects a radio resource (t*,f*) for transmission of PSSCH on link (i,j) in the operation 58. The operation 58 may be based on an expected (i.e., predicted, rather than measured) signal-to-interference-plus-noise ratio (SINR).

A number of mechanisms are possible by which a radio resource for transmission may be selected in the operation 58. Some example algorithms are discussed below.

Figure 13:
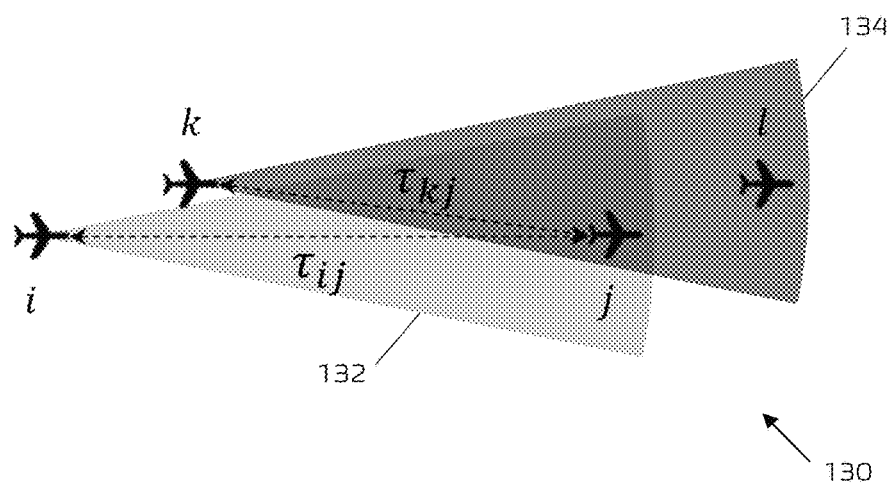

FIG. 13 is a block diagram of a system, indicated generally by the reference numeral 130, in accordance with an example embodiment.

The system 130 includes schematic indications of a first communication link (i,j) 132 for transmissions from a first device i to a second device j and a second communication link (k,l) 134 for transmissions from a third device k to a fourth device l. As shown in FIG. 13, transmission from the third device k to the fourth device l may be detected at the second device j. Thus, the link (k,l) may interfere with the link (i,j) such that the link (k,l) may be referred to as a potentially interfering link.

Figure 14:
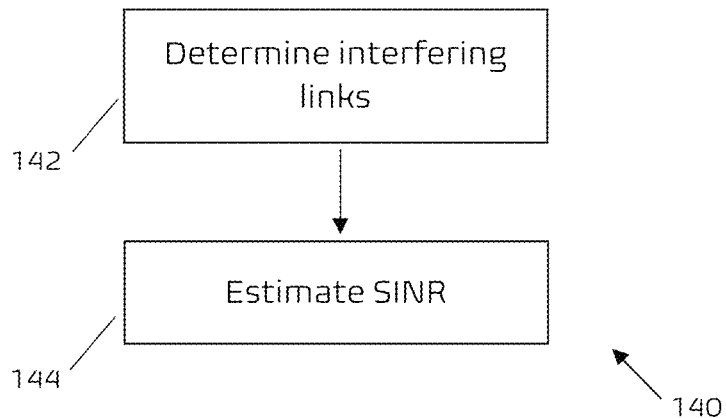
FIG. 14 is a flow chart showing an algorithm in accordance with an example embodiment.

FIG. 14 is a flow chart showing an algorithm, indicated generally by the reference numeral 140, in accordance with an example embodiment.

At operation 142, a PSSCH scheduler may determine, for some or all of a number of candidate radio resources (e.g., the candidate radio resources generated in the operation 52 described above), a first set of interfering links having potential to cause interference at the second communication node (j). As discussed above, in the system 130, for the link (i,j), the link (k,l) is a potentially interfering link.

At operation 144, a first predicted SINR is determined for communications over the direct radio link (e.g., a sidelink) based, at least in part, on a difference between a first propagation delay ($\tau_{ij}$) between the first (i) and second (j) communication nodes of the link (i,j) and a second propagation delay ($\tau_{kj}$) between a transmitting node (k) of at least one interfering link (k,l) of the first set of interfering links and the second communication node (j). The first predicted SINR may be determined based on a direction-dependent antenna gain of the first communication node (i), the second communication node (j), and/or the transmitting node (k) of the at least one interfering link.

As discussed further below, this first predicted SINR (as generated in the operation 144) may be used during the selection of a radio resource in example implementations of the operation 58 (e.g., it may be desired to maximise that SINR).

Further details of an example implementation of the algorithm 140 are provided below.

For each candidate radio resource (t,f), a PSSCH scheduler may determine a first set $L_{ij}^T(t,f)$ of potentially interfering links (k,l) whose transmission, scheduled in radio resource (t',f'), may cause harmful interference to link (i,j) if scheduled in radio resource (t,f), as illustrated in the system 130. In order to determine whether such interference potential exists, the PSSCH scheduler may use the determined (or reported) SL propagation delays. More specifically, the set $L_{ij}^T(t,f)$ may be defined as follows:

$$L_{ij}^T(t,f) = \{(k,l) \text{ scheduled in } (t',f') \text{ overlapping with } (t+\tau_{ij}-\tau_{kj},f)\} \quad (1)$$

i.e., a potentially interfering link is defined as a link (k,l) scheduled in a radio resource (t', f') that overlaps with the candidate radio resource (t,f) shifted in time by a time offset $\Delta\tau = \tau_{ij} - \tau_{kj}$. Note that, in the particular case $\tau_{ij} \approx \tau_{kj}$, the time offset $\Delta\tau$ is essentially zero, and the situation is similar to terrestrial networks, where SL propagation delay is largely negligible.

Based on the determined set $L_{ij}^T(t,f)$, the PSSCH scheduler may calculate an expected SINR for link (i,j) if scheduled in radio resource (t,f) as follows:

$$\Gamma_{ij}(t,f) = \frac{P_{ij} G_{ij}(\theta_{ij},\varphi_{ij}) G_{ji}(\theta_{ji},\varphi_{ji}) r_{ij}^{-2}}{\sum_{(k,l) \in L_{ij}^T(t,f)} P_{kl} G_{kl}(\theta_{kj},\varphi_{kj}) G_{ji}(\theta_{jk},\varphi_{jk}) r_{kj}^{-2} + N} \quad (2)$$

where $\Gamma_{ij}(t,f)$ is an expected SINR for link (i,j) if scheduled in radio resource (t,f)

$P_{ij}$ is a transmit power used by UE i when transmitting to UE j $G_{ij}$ is a direction-dependent antenna gain of UE i when transmitting to (or receiving from) UE j $(\theta_{ij},\varphi_{ij})$ is the direction (elevation, azimuth) pointing to UE j in UE i's horizontal coordinate system $r_{ij}$ is the line-of-sight distance between UE i and UE j N is a receiver noise power The line-of-sight distance $r_{ij}$ and direction $(\theta_{ij},\varphi_{ij})$ for any pair of UEs (i,j) may be determined by the gNB using well-known geometric formulas based on a location (e.g., geographic coordinates) of the UEs.

The transmit power $P_{ij}$ used for PSSCH may be set to a known constant for all links (e.g., equal to a maximum UE transmit power $P_{max}$) or may be network controlled (and therefore known to the gNB). In the former case, and ignoring the receiver noise power N, the above expected SINR may be replaced by an expected signal-to-interference ratio (SIR)

$$\Gamma_{ij}(t,f) = \frac{G_{ij}(\theta_{ij},\varphi_{ij}) G_{ji}(\theta_{ji},\varphi_{ji}) r_{ij}^{-2}}{\sum_{(k,l) \in L_{ij}^T(t,f)} G_{kl}(\theta_{kj},\varphi_{kj}) G_{ji}(\theta_{jk},\varphi_{jk}) r_{kj}^{-2}} \quad (3)$$

In the hypothetical case of isotropic (omnidirectional) PSSCH transmission/reception, the SIR may be further simplified to:

$$\Gamma_{ij}(t,f) = \frac{r_{ij}^{-2}}{\sum_{(k,l) \in L_{ij}^T(t,f)} r_{kj}^{-2}} \quad (4)$$

which depends only on the line-of-sight distances among the UEs and the set $L_{ij}^T(t,f)$.

In an example embodiment including directional (e.g., beamformed) PSSCH transmission and/or reception, the gNB may receive information on the direction-dependent antenna gain $G_{ij}(\theta,\varphi)$ from the respective UEs. This information may be reported by the UE using an RRC message or a MAC Control Element (CE) in the uplink.

In order to minimize signaling overhead, the direction-dependent antenna gain $G_{ij}(\theta,\varphi)$ may be compactly described by one or more SL beam characteristics.

Figure 15:
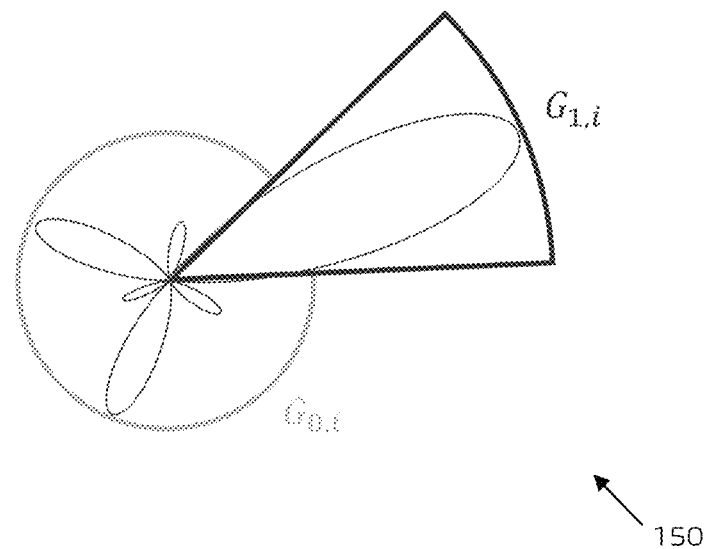
FIGS. 15 to 18 are block diagrams of systems in accordance with example embodiments.

FIG. 15 is a block diagram of a system, indicated generally by the reference numeral 150, in accordance with an example embodiment in which SL beam characteristics comprise a first SL beam gain $G_{1,i}$ corresponding to a main lobe of a radiation pattern and a second SL beam gain $G_{0,i}$ corresponding to a side lobe of the radiation pattern.

SL beam characteristics may also comprise a SL beamwidth, such as an elevation beamwidth $\Delta\theta_i$ (e.g., a half-power elevation beamwidth) and/or an azimuth beamwidth $\Delta\varphi_i$ (e.g., a half-power azimuth beamwidth).

Figure 16:
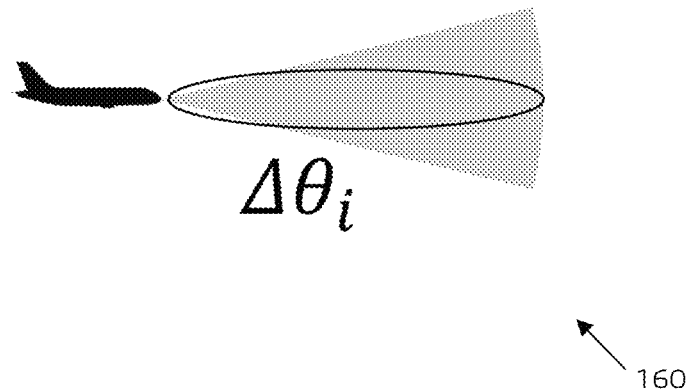
Figure 17:
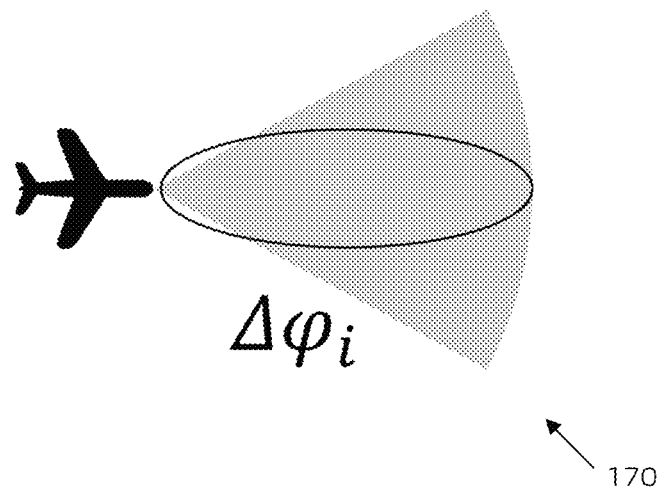

FIG. 16 is a block diagram of a system, indicated generally by the reference numeral 160, in accordance with an example embodiment, in which an elevation beamwidth $\Delta\theta_i$ is shown. Similarly, FIG. 17 is a block diagram of a system, indicated generally by the reference numeral 170, in accordance with an example embodiment, in which an azimuth beamwidth $\Delta\varphi_i$ is shown.

Specific antenna gain or beamwidth values may be reported to the gNB by using an index into a predefined table of possible values. For example, the gNB may use this information to approximate the direction-dependent antenna gain by $$G_{ij}(\theta,\varphi) = G_{0,i} + (G_{1,i} - G_{0,i}) \prod \left(\frac{\theta - \theta_{ij}}{\Delta\theta_i}\right) \prod \left(\frac{\varphi - \varphi_{ij}}{\Delta\varphi_i}\right) \quad (5)$$

where $\Pi(\cdot)$ denotes the rectangle function. Such an approximation may be considered conservative, as it assumes a higher antenna gain (and therefore interference) in directions away from the main lobe than the actual antenna gain in those directions. Thus, the PSSCH scheduler may use such an approximation to "be on the safe side". Note that, in the particular case $(\theta,\varphi)=(\theta_{ij},\varphi_{ij})$, this reduces to $G_{ij}(\theta_{ij}, \varphi_{ij})=G_{1,i}$ (i.e., the main-lobe gain), and thus $$\Gamma_{ij}(t, f) = \frac{G_{1,i}G_{1,j}r_{ij}^{-2}}{\sum_{(k,l) \in \mathcal{L}_{ij}^T(t,f)} G_{kl}(\theta_{kj}, \varphi_{kj})G_{ji}(\theta_{jk}, \varphi_{jk})r_{kj}^{-2}} \quad (6)$$

The main contribution to the denominator (i.e., interference) comes from those links (k,l) in the set L (t,f) for which $$G_{kl}(\theta_{kj},\varphi_{kj})G_{ji}(\theta_{jk},\varphi_{jk})=G_{1,k}G_{1,j} \quad (7)$$

i.e., UE j falls within UE k's transmit beam (main lobe) and UE k falls within UE j's receive beam (main lobe). For example, the gNB may determine that UE j falls within UE k's transmit beam if $|\theta_{kj}-\theta_{kl}|<\Delta\theta_k/2$ and $|\varphi_{kj}-\varphi_{kl}|<\Delta\varphi_k/2$. Similarly, the gNB may determine that UE k falls within UE j's receive beam if $|\theta_{jk}-\theta_{ji}|<\Delta\theta_j/2$ and $|\varphi_{jk}-\varphi_{ji}|<\Delta\varphi_j/2$.

Denoting by $L_m(t,f)$ the set of such main interference contributors according to the above condition, the following approximation may be used by the PSSCH scheduler $$\Gamma_{ij}(t, f) \approx \frac{G_{1,i}G_{1,j}r_{ij}^{-2}}{\sum_{(k,l) \in \mathcal{L}_m(t,f)} G_{1,k}G_{1,j}r_{kj}^{-2}} \quad (8)$$

In the particular case where $G_{1,i}$ does not depend on i (i.e., is similar for all UEs), this approximation reduces to $$\Gamma_{ij}(t, f) \approx \frac{r_{ij}^{-2}}{\sum_{(k,l) \in \mathcal{L}_m(t,f)} r_{kj}^{-2}} \quad (9)$$

which depends only on the line-of-sight distances among the UEs and the set of main interference contributors $L_m(t,f)$ defined above.

Any of the above formulas (including approximations) may be used by the PSSCH scheduler to determine an expected SINR or SIR for a link. Naturally, more precise knowledge of SL beam characteristics may lead to a better estimate of the actual SINR or SIR experienced by the link.

In any of the above formulas, an interference contribution from a potentially interfering link (k,l) in the denominator sum may be neglected (i.e., considered to be zero) if the potentially interfering UE k is located beyond a maximum SL interference range $\rho$ from UE j. Such a maximum SL interference range may be used, for instance, to model the LOS horizon between a pair of aircraft flying at a certain (maximum) altitude h. More specifically, such a maximum SL interference range may be specified by:

$$\rho = 2\sqrt{h^2 + 2R_E h} \quad (10)$$

where $R_E$ denotes the Earth's radius. For example, in the special case of commercial aviation, a typical flight altitude of 35000 ft leads to a maximum SL (aircraft-to-aircraft) interference range of approximately 750 km. Thus, any pair of aircraft separated beyond this horizon is effectively shielded from each other by the Earth (in the frequency ranges of interest to embodiments described herein).

This shielding effect may be taken into account in any of the above formulas by including a term $\Theta(\rho-r_{kj})$ in the denominator, where $\Theta(\cdot)$ denotes the Heaviside step function. For example, the last approximation becomes:

$$\Gamma_{ij}(t, f) \approx \frac{r_{ij}^{-2}}{\sum_{(k,l) \in \mathcal{L}_m(t,f)} \Theta(\rho - r_{kj})r_{kj}^{-2}} \quad (11)$$

As discussed above, the operation 54 of the algorithm 50 may consider potentially interfering links when identifying conflicts. As discussed further below, potentially interfered links may be relevant to the identification of conflicts.

Figure 18:
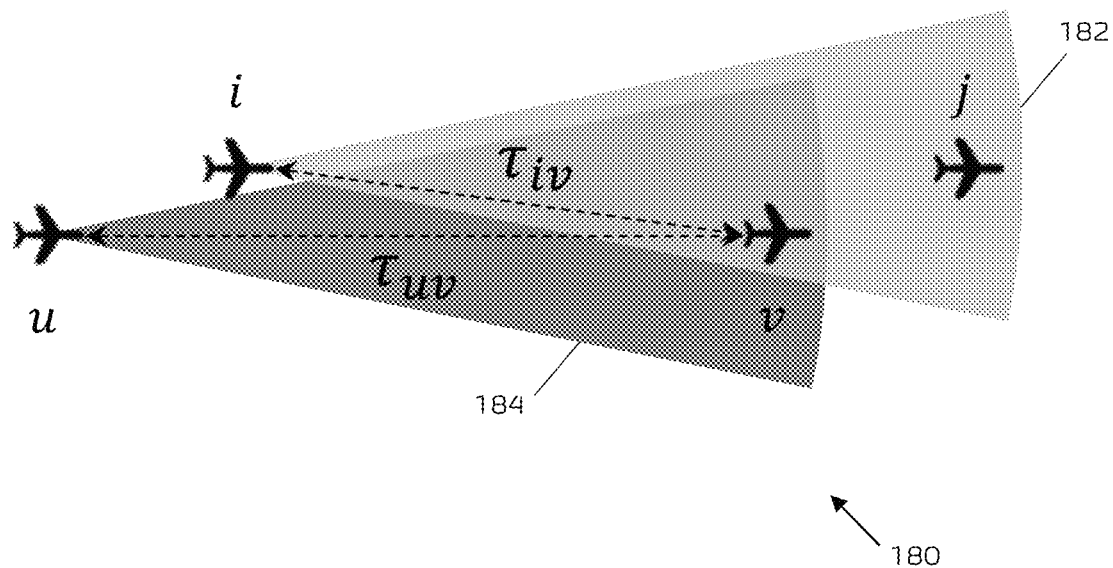

FIG. 18 is a block diagram of a system, indicated generally by the reference numeral 180, in accordance with an example embodiment.

The system 180 includes schematic indications of a first communication link (i,j) 182 for transmissions from a first device i to a second device j and a second communication link (u,v) 184 for transmissions from a third device u to a fourth device v. As shown in FIG. 18, transmission from the first device i to the second device j may be detected at the fourth device v. Thus, the link (i,j) may interfere with the link (u,v) such that the link (u,v) may be referred to as a potentially interfered link.

Figure 19:
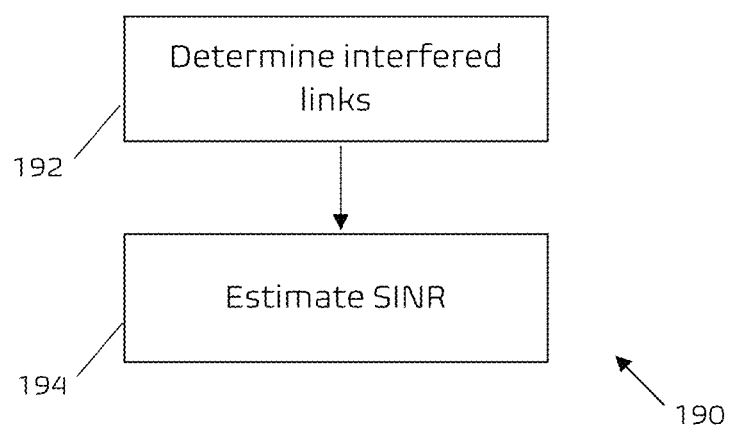
FIGS. 19 and 20 are flow charts showing algorithms in accordance with example embodiments.

FIG. 19 is a flow chart showing an algorithm, indicated generally by the reference numeral 190, in accordance with an example embodiment.

At operation 192, a PSSCH scheduler may determine, for some or all of the candidate radio resources (e.g., the candidate radio resources determines in the operation 52), a set of interfered links having potential to experience interference due to radio transmissions by the first device (i).

At operation 194, a second predicted SINR is determined for communication over at least one interfered link (u,v) of the second set of interfered links based, at least in part, on a difference between a propagation delay ($\tau_{iv}$) between the first communication node (i) and a receiving node (v) of the at least one interfered link (u,v) and a second propagation delay ($\tau_{uv}$) between the transmitting and receiving nodes of the at least one interfered link (u,v). The second predicted SINR may be determined based on a direction-dependent antenna gain of the transmitting (u) and/or receiving (v) nodes of the at least one interfered link, and/or the first communication node (i).

As discussed further below, this second predicted SINR may be used during the selection of a radio resource in example implementations of the operation 58. For example, it may be desired to maximise the lowest second predicted SINR among a plurality of interfered links.

Further details of an example implementation of the algorithm 190 are provided below.

For each candidate radio resource (t,f), a PSSCH scheduler may determine a second set $L_{ij}^R(t,f)$ of potentially interfered links (u,v) whose transmission, scheduled in radio resource (t',f'), may experience harmful interference from link (i,j) if scheduled in radio resource (t,f), as illustrated in FIG. 18. In order to determine whether such interference potential exists, the PSSCH scheduler may use the determined (or reported) SL propagation delays. More specifically, the set $L_{ij}^R(t,f)$ may be defined as follows:

$$L_{ij}^R(t,f)=\{(u,v) \text{ scheduled in } (t',f') \text{ overlapping with } (t+\tau_{iv}-\tau_{uv},f)\} \quad (12)$$

i.e., a potentially interfered link is defined as a link (u,v) scheduled in a radio resource (t',f') that overlaps with the candidate radio resource (t,f) shifted in time by a time offset $\Delta\tau'=\tau_{iv}-\tau_{uv}$. Note that, in the particular case $\tau_{iv}\approx\tau_{uv}$, the time offset $\Delta\tau'$ is essentially zero, and the situation is similar to terrestrial networks, where SL propagation delay is largely negligible.

Based on the determined set $L_{ij}^R(t,f)$, the PSSCH scheduler may calculate an expected SINR for each link (u,v) in the set $L_{ij}^R(t,f)$, under the assumption that link (i,j) will be scheduled in radio resource (t,f), as follows:

$$\Gamma_{uv}(t',f') = \frac{P_{uv}G_{uv}(\theta_{uv},\varphi_{uv})G_{vu}(\theta_{vu'},\varphi_{vu})r_{uv}^{-2}}{\sum_{(k,l)\in \mathcal{L}_{uv}^T(t',f')} P_{kl}G_{kl}(\theta_{kv},\varphi_{kv})G_{vu}(\theta_{vk},\varphi_{vk})r_{kv}^{-2} + N} \quad (13)$$

where the set $L_{uv}^T(t',f')$ in the denominator (i.e., interference) includes link (i,j).

The set $L_{ij}^R(t,f)$ of potentially interfered links (u,v) may not be limited to sidelink(s) (PSSCH). In particular, it may include one or more uplink(s) (PUSCH), in which the receiving end (v) is not a UE but rather an orbiting satellite of the NTN. In this way, the satellite is treated as "a very high-flying receiver" that may also experience interference from a potential PSSCH transmission to be scheduled, as discussed above. In this way, the PSSCH scheduler may take into account its impact on scheduled PUSCH transmissions when making PSSCH scheduling decisions, thus improving PSSCH and PUSCH coexistence. (The assumption here is that the PSSCH scheduler has access to the PUSCH schedule. Alternatively, PSSCH and PUSCH may be scheduled jointly by a single scheduler.)

The PSSCH scheduler may determine the lowest expected SINR among all potentially interfered links (u,v) in the set $L_{ij}^R(t,f)$, under the assumption that link (i,j) will be scheduled in radio resource (t,f), i.e., $$\Gamma_{min}(t,f)=\min_{(u,v)\in L_{ij}^R(t,f)}\Gamma_{uv}(t',f') \quad (14)$$

Figure 20:
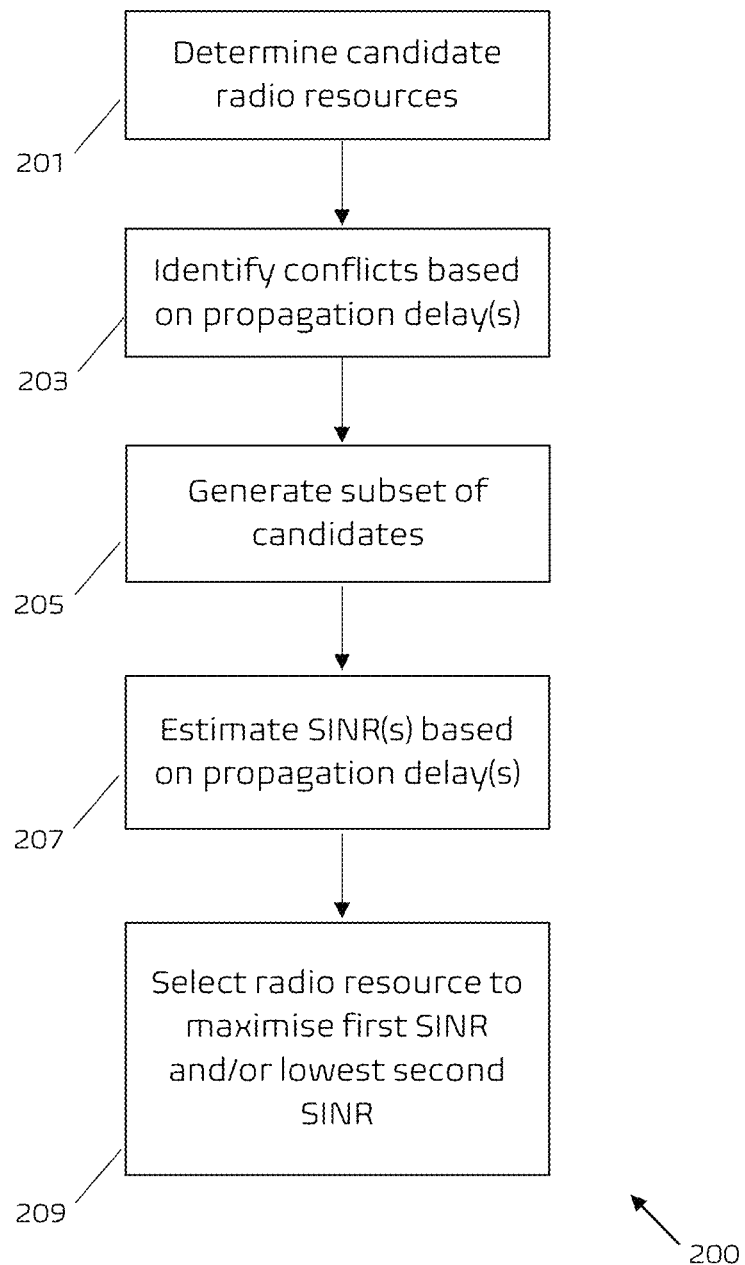

FIG. 20 is a flow chart showing an algorithm, indicated generally by the reference numeral 200, in accordance with an example embodiment.

The algorithm 200 starts at operation 201 where a set of candidate radio resources for transmitting data from a first communication node of a non-terrestrial network to a second communication node of the non-terrestrial network over a direct radio link (e.g., a NR sidelink) is determined. The operation 201 may be the same as the operation 52 described above.

At operation 203, conflicts are identified. For example, one or more of the candidate radio resources that conflict with at least one scheduled radio transmission in the non-terrestrial network may be determined based, at least in part, on a propagation delay associated with the at least one scheduled radio transmission and/or a propagation delay associated with the radio transmission by the first communication node. The operation 203 may be the same as the operation 54 described above.

At operation 205, a subset of candidate radio resources is generated by excluding the one or more conflicting radio resources identified in the operation 203 from the set of candidate radio resources determined in the operation 201.

At operation 207, one or more SINR values is/are predicted. The SINR values may include the first SINR value determined in the operation 144 described above and/or the second SINR value determined in the operation 194 described above.

Finally, a radio resource is selected in operation 209 from the subset of candidate radio resources for transmitting the data over the direct radio link.

The operation 209 may select the candidate radio resource such that:

The first predicted SINR is maximised;

The lowest of the second predicted SINRs is maximised; or

Some combination of the above requirements.

Further details of the operation 209 are provided below.

Based on the determined expected SINR for link (i,j) in each candidate radio resource (t,f), the PSSCH scheduler may select a radio resource (t*,f*) that maximizes the expected SINR, i.e., $$(t^*,f^*)=\mathrm{argmax}_{(t,f)}\Gamma_{ij}(t,f) \quad (15)$$

Although this 'greedy' approach maximizes the expected SINR for link (i,j), it does not take into account the potentially adverse impact (i.e., degradation of link quality) this scheduling decision may have on any of the potentially interfered links in the set Ly (t,f).

Instead of (or in addition to) maximizing the expected SINR for link (i,j), the PSSCH scheduler may select a radio resource (t*,f*) that maximizes the lowest (i.e., worst-case) expected SINR among all interfering links (i.e., a max-min criterion), i.e., $$(t^*,f^*)=\mathrm{argmax}_{(t,f)} \min(\Gamma_{ij}(t,f),\Gamma_{min}(t,f)) \quad (16)$$

From this perspective, the 'best' radio resource is that in which the PSSCH transmission to be scheduled "fits best" (i.e., the lowest expected SINR among all interfering links is highest).

In case of a tie, the PSSCH scheduler may select a radio resource randomly among the tied radio resources or use another criterion to break the tie (e.g., select the earliest radio resource in time).

The PSSCH scheduler may schedule a link (i,j) semi-persistently (i.e., using a configured grant). In this case, the selected radio resource (t*,f*) may recur in time with a configured periodicity T (slots) for a number M of transmit opportunities, i.e., the link is scheduled in a set of equally spaced (in the time domain) radio resources (t*+mT,f*) for m=0, . . . , M−1.

In order to ensure a good link quality throughout the persistence time (MT), the PSSCH scheduler may select a radio resource (t*,f*) that maximizes the lowest expected SINR of the link across all transmit opportunities, i.e., $$(t^*,f^*)=\mathrm{argmax}_{(t,f)} \min_m \Gamma_{ij}(t+mT,f) \quad (17)$$

Instead of (or in addition to) maximizing the lowest expected SINR for link (i,j) across all transmit opportunities, the PSSCH scheduler may select a radio resource (t*,f*) that maximizes the lowest expected SINR among all interfering links and across all transmit opportunities, i.e., $$(t^*,f^*)=\mathrm{argmax}_{(t,f)} \min_m \min(\Gamma_{ij}(t+mT,f),\Gamma_{min}(t+mT,f)) \quad (18)$$

In at least some example embodiments discussed above, in order to cope with long SL propagation delays of up to several slots, a PSSCH scheduler is proposed that uses determined or reported SL propagation delay information to perform collision-free PSSCH scheduling—without the need for spectrally inefficient, latency-increasing slot aggregation. Based on SL propagation delay information, half-duplex (HD) conflicts as well as conflicts related to SL beam availability at TX and RX are identified and conflicting slots can be excluded from resource allocation. Potentially interfering and potentially interfered links from the requesting link's perspective are determined likewise on the basis of such SL propagation delay information. SINR prediction based on assumed LOS radio channels and direction-dependent SL antenna gain information available at the gNB may be used to allocate radio resources in a way that minimizes cross-interference among links.

Figure 21:
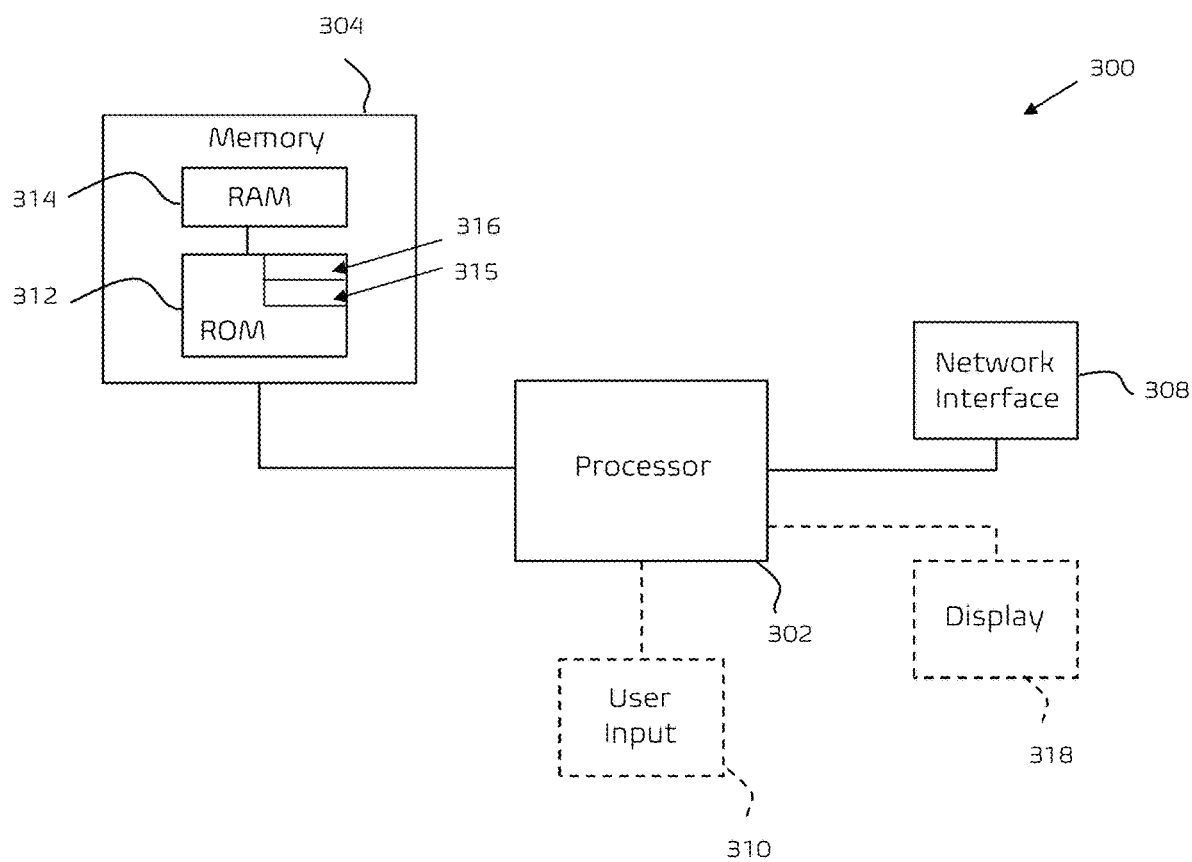
FIG. 21 is a block diagram of components of a system in accordance with an example embodiment.

For completeness, FIG. 21 is a schematic diagram of components of one or more of the example embodiments described previously, which hereafter are referred to generically as a processing system 300. The processing system 300 may, for example, be the apparatus referred to in the claims below.

The processing system 300 may have a processor 302, a memory 304 closely coupled to the processor and comprised of a RAM 314 and a ROM 312, and, optionally, a user input 310 and a display 318. The processing system 300 may comprise one or more network/apparatus interfaces 308 for connection to a network/apparatus, e.g., a modem which may be wired or wireless. The network/apparatus interface 308 may also operate as a connection to other apparatus such as device/apparatus which is not network side apparatus. Thus, direct connection between devices/apparatus without network participation is possible.

The processor 302 is connected to each of the other components in order to control operation thereof.

The memory 304 may comprise a non-volatile memory, such as a hard disk drive (HDD) or a solid state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain code which, when executed by the processor, implements aspects of the algorithms 50, 90, 100, 110, 140, 190 and 200 described above. Note that in the case of small device/apparatus the memory can be most suitable for small size usage, i.e., not always a hard disk drive (HDD) or a solid state drive (SSD) is used.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus, i.e., embedded to very small size.

In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figure 22A:
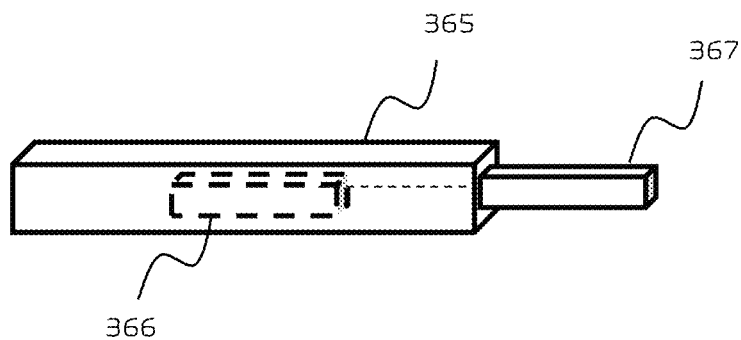
FIGS. 22A and 22B show tangible media, respectively a removable non-volatile memory unit and a compact disc (CD), storing computer-readable code which, when run by a computer, performs operations according to example embodiments.
Figure 22B:
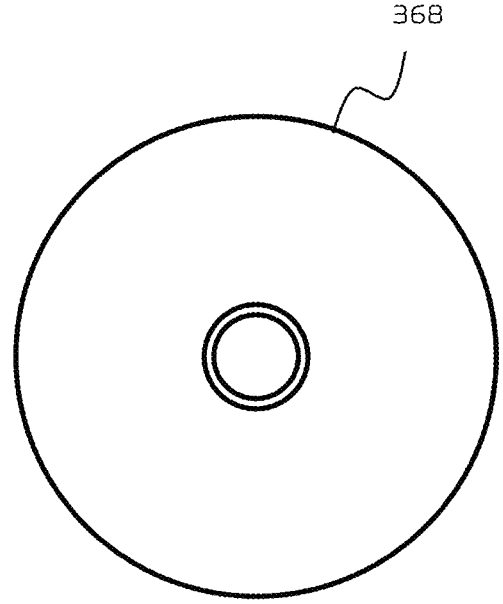

FIGS. 22A and 22B show tangible media, respectively a removable memory unit 365 and a compact disc (CD) 368, storing computer-readable code which, when run by a computer, may perform methods according to example embodiments described above. The removable memory unit 365 may be a memory stick, e.g., a USB memory stick, having internal memory 366 storing the computer-readable code. The internal memory 366 may be accessed by a computer system via a connector 367. The CD 368 may be a CD-ROM or a DVD or similar. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable medium", "computer program product", "tangibly embodied computer program" etc., or a "processor" or "processing circuitry" etc. should be understood to encompass not only computers having differing architectures such as single/multi-processor architectures and sequential/parallel architectures, but also specialised circuits such as field programmable gate arrays (FPGA), application specific integrated circuits (ASIC), signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

If desired, the different functions discussed herein may be performed in a different order and/or concurrently with each other. Furthermore, if desired, one or more of the above-described functions may be optional or may be combined. Similarly, it will also be appreciated that the flow diagrams of FIGS. 5, 9 to 11, 14, 19 and 20 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus, comprising:
   at least one processor; and
   at least one memory including computer program code which, when executed by the at least one processor, causes the apparatus to perform:
   determining a set of candidate radio resources for transmitting data from a first communication node of a non-terrestrial network to a second communication node of the non-terrestrial network over a direct radio link;
   identifying one or more of the candidate radio resources as conflicting radio resources that conflict with at least one scheduled radio transmission in the non-terrestrial network based, at least in part, on a propagation delay associated with the at least one scheduled radio transmission and/or a propagation delay associated with the radio transmission by the first communication node;
   generating a subset of candidate radio resources by excluding the identified one or more conflicting radio resources from the set of candidate radio resources; and
   selecting a radio resource from the subset of candidate radio resources for transmitting the data over the direct radio link.

2. The apparatus as claimed in claim 1, wherein the direct radio link comprises a sidelink.

3. The apparatus as claimed in claim 1, wherein identifying the one or more conflicting radio resources further comprises:
   determining an estimated reception time interval at the first communication node for receiving a scheduled radio transmission by a third communication node of the non-terrestrial network using a transmission time interval for the scheduled radio transmission and a propagation delay between the third and first communication nodes; and
   identifying one or more candidate radio resources overlapping in time with the estimated reception time interval at the first communication node.

4. The apparatus as claimed in claim 1, wherein identifying the one or more conflicting radio resources further comprises:
   determining estimated reception time intervals at the second communication node for at least some of the set of candidate radio resources based on respective transmission time intervals of said candidate radio resources and the propagation delay between the first and second communication nodes; and
   identifying one or more candidate radio resources having estimated reception time intervals at the second communication node which overlap in time with a scheduled radio transmission by the second communication node.

5. The apparatus as claimed in claim 1, wherein the at least one memory and computer program code, when executed by the at least one processor, further causes the apparatus to perform: determining one or more first time intervals during which a maximum number of simultaneous transmit links is scheduled to be operated by the first communication node, and wherein the identifying the one or more conflicting radio resources is configured to identify one or more candidate radio resources overlapping in time with any of said first time intervals.

6. The apparatus as claimed in claim 1, wherein the at least one memory and computer program code, when executed by the at least one processor, further causes the apparatus to perform: determining one or more second time intervals during which a maximum number of simultaneous receive links is scheduled to be operated by the second communication node, and wherein the identifying the one or more conflicting radio resources is configured to determine estimated reception time intervals at the second communication node using respective transmission time intervals associated with the candidate radio resources and the propagation delay between the first and second communication nodes, and to identify one or more candidate radio resources having respective reception time intervals which overlap in time with any of said second time intervals.

7. The apparatus as claimed in claim 1, wherein the at least one memory and computer program code, when executed by the at least one processor, further causes the apparatus to perform:
   determining, for some or all of the candidate radio resources, a first set of interfering links having potential to cause interference at the second communication node; and
   determining a first predicted SINR for communication over the direct radio link based, at least in part, on a difference between a first propagation delay between the first and second communication nodes and a second propagation delay between a transmitting node of at least one interfering link of the first set of interfering links and the second communication node.

8. The apparatus as claimed in claim 7, wherein the first predicted SINR is determined based on a direction-dependent antenna gain of one or more of: the first communication node, the second communication node, the transmitting node of the at least one interfering link.

9. The apparatus as claimed in claim 7, wherein selecting the radio resource from the subset of candidate radio resources for transmitting the data over the direct radio link is configured to select the candidate radio resource that maximizes the first predicted SINR.

10. The apparatus as claimed in claim 1, wherein the at least one memory and computer program code, when executed by the at least one processor, further causes the apparatus to perform:
    determining, for some or all of the candidate radio resources, a second set of interfered links having potential to experience interference due to radio transmissions from the first communication node to the second communication node; and
    determining a second predicted SINR for communication over at least one interfered link of the second set of interfered links based, at least in part, on a difference between a third propagation delay between the first communication node and a receiving node of the at least one interfered link and a fourth propagation delay between transmitting and receiving nodes of the at least one interfered link.

11. The apparatus as claimed in claim 10, wherein the second predicted SINR is determined based on a direction-dependent antenna gain of the transmitting and/or receiving nodes of the at least one interfered link, and/or the first communication node.

12. The apparatus as claimed in claim 10, wherein selecting the radio resource from the subset of candidate radio resources for transmitting the data over the direct radio link is configured to select the candidate radio resource that maximizes a lowest second predicted SINR among a plurality of interfered links of the second set of interfered links.

13. The apparatus as claimed in claim 7, wherein the at least one memory and computer program code, when executed by the at least one processor, further causes the apparatus to perform:
- determining, for some or all of the candidate radio resources, a second set of interfered links having potential to experience interference due to radio transmissions from the first communication node to the second communication node; and
- determining a second predicted SINR for communication over at least one interfered link of the second set of interfered links based, at least in part, on a difference between a third propagation delay between the first communication node and a receiving node of the at least one interfered link and a fourth propagation delay between transmitting and receiving nodes of the at least one interfered link,
- wherein selecting the radio resource from the subset of candidate radio resources for transmitting the data over the direct radio link is configured to select the candidate radio resource that maximises the minimum among the first predicted SINR and the lowest second predicted SINR.

14. A method comprising:
- determining a set of candidate radio resources for transmitting data from a first communication node of a non-terrestrial network to a second communication node of the non-terrestrial network over a direct radio link;
- identifying one or more of the candidate radio resources as conflicting radio resources that conflict with at least one scheduled radio transmission in the non-terrestrial network based, at least in part, on a propagation delay associated with the at least one scheduled radio transmission and/or a propagation delay associated with the radio transmission by the first communication node;
- generating a subset of candidate radio resources by excluding the identified one or more conflicting radio resources from the set of candidate radio resources; and
- selecting a radio resource from the subset of candidate radio resources for transmitting the data over the direct radio link.

15. A computer program embodied on a non-transitory computer-readable medium, said computer program comprising instructions for causing an apparatus to perform at least the following:
- determining a set of candidate radio resources for transmitting data from a first communication node of a non-terrestrial network to a second communication node of the non-terrestrial network over a direct radio link;
- identifying one or more of the candidate radio resources as conflicting radio resources that conflict with at least one scheduled radio transmission in the non-terrestrial network based, at least in part, on a propagation delay associated with the at least one scheduled radio transmission and/or a propagation delay associated with the radio transmission by the first communication node;
- generating a subset of candidate radio resources by excluding the identified one or more conflicting radio resources from the set of candidate radio resources; and
- selecting a radio resource from the subset of candidate radio resources for transmitting the data over the direct radio link.

* * * * *